Aug. 22, 1961 W. T. FARNDON 2,997,270
RACKS FOR SPECTACLES
Filed Dec. 17, 1959
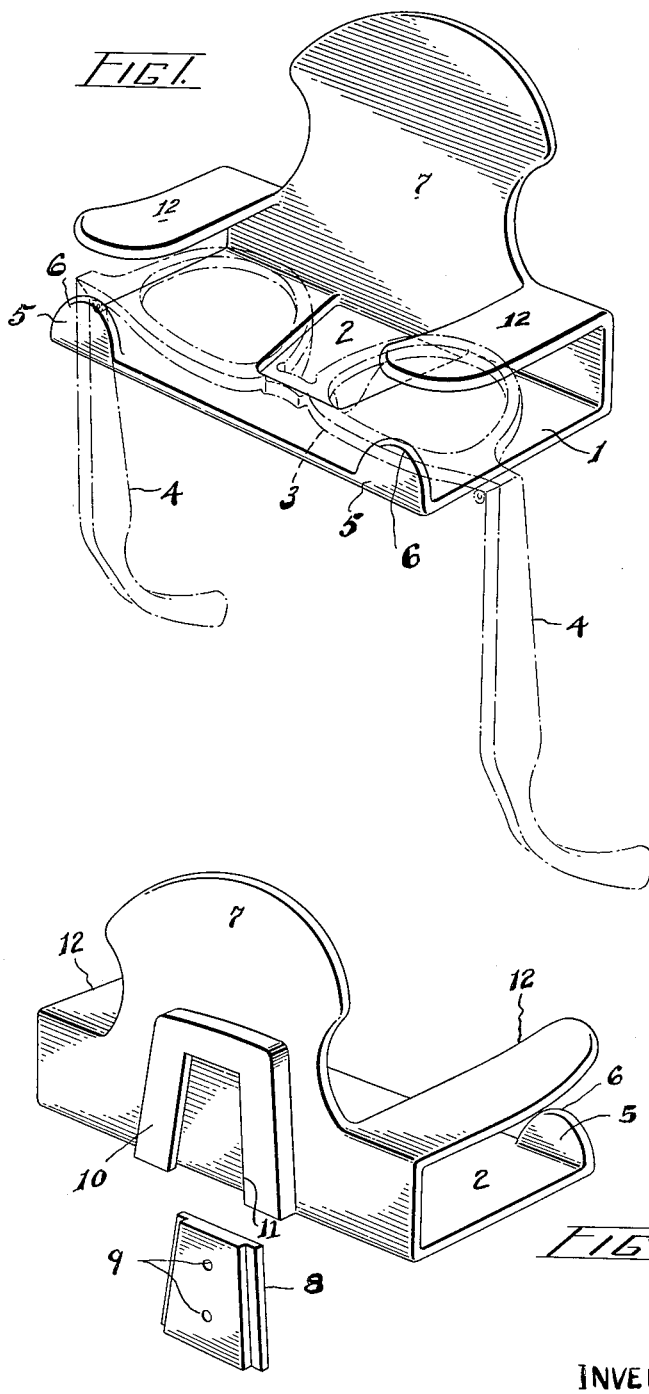
INVENTOR
WILFRED T. FARNDON
By Frederick E. Bromley United States Patent Office 2,997,270
Patented Aug. 22, 1961

2,997,270
RACKS FOR SPECTACLES
Wilfred T. Farndon, 1 Merritt Road, Toronto,
Ontario, Canada
Filed Dec. 17, 1959, Ser. No. 860,201
2 Claims. (Cl. 248—309)

My invention relates to improvements in holders for spectacles and particularly aims to provide an improved holder in the nature of a wall rack of a novel construction for holding spectacles when not in use.

According to the present invention there is provided a wall rack suitable for men's, ladies' and children's spectacles and designed to retain them in a secure and readily available manner without likelihood of their becoming damaged and which obviates the lenses from becoming scratched or broken.

An important object of my invention is to provide a rack of the kind referred to which will enable a pair of spectacles to be supported with the temples depending from the ends of the rack and with the nose pieces accommodated by an aperture in the shelf portion of the rack whereby the lenses are kept clear of the supporting surface and free of damage. Another important object of the invention is to provide a rack of the kind referred to with one or more fingers upstanding at the front of the shelf portion so as to positively retain the spectacles against being inadvertently slid off the shelf.

Still another salient feature is to provide one or more overlying fingers extending forwardly from the rear portion of the shelf and terminating at the front portion thereof, and spaced to provide a gap for passage of the spectacles in placing them on the shelf and removing them therefrom. These fingers operate to preclude the spectacles from being inadvertently knocked off the shelf and they cooperate with the retaining fingers in providing a simple and efficient rack for the purpose described. The rack may be supplied with any form of a known device for suspending it on a wall of a room.

The invention provides a highly desirable and useful rack which may be economically manufactured of a suitable plastic material for example. The rack has the advantage that it is not necessary to fold spectacles in placing them thereon. A person with poor eyesight may place spectacles on it without difficulty and without fear of their being accidentally knocked off when attempting to remove them from the rack.

The invention consists in the novel construction and arrangement of parts as set forth in the ensuing specification shown in the accompanying drawing forming a part thereof.

In the drawing:

FIG. 1 is a perspective view viewing the rack from the front and showing in phantom a pair of spectacles supported thereon;

FIG. 2 is a further perspective view of the rack looking at the rear thereof and depicting a standard attachment device for suspending it from a wall.

The preferred embodiment of the invention as shown in the drawing comprises a shelf 1, shown as an irregular rectangular member of a greater length than depth and having a suitable intermediate aperture 2 which is of a size and disposition to accommodate the nose pieces of a pair of spectacles and to allow the nose pieces to project downwardly so that the lenses do not make contact with the upper surface of the shelf. The spectacles, generally indicated at 3, are shown as of the type having temples 4.

Said shelf is of a length to allow the spectacles to rest thereon with the temples 4 depending freely at the ends of the shelf as clearly shown in FIG. 1.

In order to preclude the spectacles from being inadvertently slid off the shelf there is provided one or more fingers 5 at the front thereof. Desirably as shown there are two such fingers, one at each end of the shelf and upstanding from the front edge thereof. These retaining fingers are constructed as an integral part of the shelf and may have rounded upper ends, indicated at 6.

A back wall member 7 is also fashioned as an integral part of the shelf by way of preference and this preferably rises from the shelf to enable the rack to be attached to a wall of a room as by the common expedient. The rear wall member may be of any ornate design according to the dictates of manufacture. The fastening device shown by way of example but not of limitation, consists of a wedge member 8 which is secured to a wall as by screws fitted in holes 9, for example. This wedge block is detachably engaged in a socket plate 10 having a socket 11 which receives the part 8 as is well known in the art. This attachment device has been found to be entirely satisfactory although it is obvious that it does not per se form a part of the invention and there are of course several other standard expedients that may be resorted in lieu thereof.

To guard against the spectacles being inadvertently knocked upwardly and dislodged from the shelf there is provided one or more guard fingers as at 12. These guard fingers of which there is preferably a pair each in alignment with a retaining finger 5 extend forwardly from the rear wall 7 and overlie the spectacles, the guard fingers are spaced above the shelf and terminate at the retaining finger 5. There is a gap between the terminus of each guard finger and the corresponding retaining finger sufficient to provide a passage for admitting the spectacles and removing them.

From the preceding description it will be understood that the invention provides a serviceable and effective rack on which a pair of spectacles may be held with safety. The rack lends itself to economical manufacture and when made of plastic may be produced in attractive and harmonizing colours. The invention is more particularly ascertained in the ensuing claims.

What I claim is:

1. A wall rack for supporting spectacles in an inverted open condition with the temples depending from the lens portion, comprising a horizontal planar shelf of greater length than width and including a front edge and opposed side edges, said shelf including an intermediate transverse aperture portion for receiving the nose piece of the spectacles therethrough when the lens are juxtaposed on the upper surface of said shelf and the depending temples extend over the opposed side edges, retaining finger means projecting vertically from said front edge of said shelf and above the upper surface thereof for preventing the spectacles from sliding in the plane of the upper surface of said shelf off said front edge, and a back wall member extending vertically from said shelf member spaced from said front edge and including means for mounting said shelf in a horizontal position on a support, said back wall member including guard-forming finger means projecting horizontally and immediately above the upper surface of said shelf and terminating inwardly of said retaining finger means for accommodating edge-wise movement of the lens portion of the spectacles therebetween and preventing said lens portion from being tilted off said shelf when the temples are accidentally struck.

2. The structure of claim 1; said wall rack comprising a unitary member, said retaining finger means comprising a pair of elements spaced along the front edge of said shelf and normal to the upper surface thereof, said guard-forming finger means comprising a pair of elements in alignment with said first mentioned finger elements and having upwardly turned forward ends spaced above and inwardly of the terminal ends of the first mentioned finger elements.

References Cited in the file of this patent

UNITED STATES PATENTS

| | | |
|---|---|---|
| D. 154,438 | Spano | July 5, 1949 |
| D. 157,780 | Opperman | Mar. 21, 1950 |
| 1,794,700 | McCaskey | Mar. 3, 1931 |
| 2,817,487 | Wantz | Dec. 24, 1957 |
| 2,884,220 | Manley | Apr. 28, 1959 |
| 2,916,159 | O'Neill | Dec. 8, 1959 |